United States Patent
Baumann et al.

(10) Patent No.: US 7,343,809 B2
(45) Date of Patent: Mar. 18, 2008

(54) METHOD AND DEVICE FOR DETERMINING THE PRESSURE IN PIPES

(75) Inventors: Julian Baumann, Karlsruhe (DE); Dirk Göger, Stutensee (DE); Thomas Schlegl, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 169 days.

(21) Appl. No.: 11/237,496

(22) Filed: Sep. 27, 2005

(65) Prior Publication Data

US 2006/0070448 A1 Apr. 6, 2006

(30) Foreign Application Priority Data

Oct. 1, 2004 (DE) .................... 10 2004 047 959

(51) Int. Cl.
*G01L 9/10* (2006.01)
(52) U.S. Cl. ........................................... 73/728
(58) Field of Classification Search ............. 73/118.1, 73/774, 781, 796, 862.041, 728; 123/32
See application file for complete search history.

(56) References Cited

U.S. PATENT DOCUMENTS

| | | | | |
|---|---|---|---|---|
| 4,010,717 A * | 3/1977 | Taplin | .................. | 123/492 |
| 4,179,939 A | 12/1979 | Price | ..................... | 73/730 |
| 4,408,496 A | 10/1983 | Dahle et al. | ............... | 73/728 |
| 4,524,624 A | 6/1985 | Di Noia et al. | .............. | 73/708 |
| 4,541,288 A | 9/1985 | Kornrumpf et al. | ..... | 73/862.69 |
| 4,561,314 A | 12/1985 | Alley et al. | ............. | 73/862.69 |
| 4,621,503 A | 11/1986 | Woods et al. | .............. | 62/228.3 |
| 4,843,887 A | 7/1989 | Engeler et al. | ............... | 73/730 |
| 5,007,295 A | 4/1991 | Gustafsson et al. | ....... | 73/862.69 |
| 6,176,139 B1 * | 1/2001 | Seils et al. | .................... | 73/774 |
| 6,553,819 B1 | 4/2003 | Schernewski et al. | ........ | 73/119 |
| 6,561,036 B1 | 5/2003 | Gustafsson et al. | ........... | 73/714 |
| 2003/0160118 A1 | 8/2003 | Schmauser | ............... | 239/585.1 |
| 2004/0009351 A1 | 1/2004 | Venigalla et al. | ........... | 428/386 |

FOREIGN PATENT DOCUMENTS

| | | |
|---|---|---|
| DE | 906625 | 7/1954 |
| DE | 3604088 | 8/1987 |
| DE | 19757293 A1 | 7/1999 |
| DE | 101 00 957 A1 | 7/2002 |
| EP | 0589517 | 9/1993 |
| EP | 0 780 676 A1 | 6/1997 |
| EP | 1 162 442 A1 | 12/2001 |
| WO | 02066809 | 8/2002 |

* cited by examiner

*Primary Examiner*—Jewel Thompson
(74) *Attorney, Agent, or Firm*—Baker Botts L.L.P.

(57) ABSTRACT

In a method for determining the absolute pressure in pipes through which there is a fluid flow, in particular injection lines in diesel-operated internal combustion engine, a first signal from a first pressure sensor is detected. This first signal is integrated. The integrated signal is multiplied by a factor. This multiplied factor is then added to an operating pressure. This method advantageously allows detection of the absolute pressure within the injection line that connects the rail of an internal combustion engine to the corresponding injector.

25 Claims, 4 Drawing Sheets

METHOD AND DEVICE FOR DETERMINING THE PRESSURE IN PIPES

CROSS-REFERENCE TO RELATED APPLICATIONS

This application claims priority from German Patent Application No. 10 2004 047 959.3, which was filed on Oct. 1, 2004, and is incorporated herein by reference in its entirety.

TECHNICAL FIELD

The invention relates to a method for determining the pressure in pipes and a corresponding device.

BACKGROUND

When developing diesel engines, two important objectives are to reduce emissions and to reduce fuel consumption. Attempts are made to achieve this with on the one hand greater precision when establishing the injection pattern and on the other hand a more homogenous combustion process in the engine. In addition to system hardware modifications, which for example allow the smallest possible quantity of fuel to be injected to be reduced, the pressure in the fuel injection line is also increasingly raised.

The most recent generations of injectors allow multiple injections, resulting in the injector needles undergoing a number of opening and closing operations at very short time intervals. These needle movements produce pressure oscillations in the injection line, the amplitude of which can amount to a deviation of around 10% from the operating point. The precise pattern of pressure fluctuations over time is a function of the selected injection pattern, the injector characteristics, the hydraulic properties of the injection line and the high-pressure pump as well as fuel properties such as temperature and viscosity. The large number of influencing parameters means that pressure fluctuations cannot be calculated analytically at present.

The pressure fluctuations at the injector end of the injection line influence the quantity and pattern over time of the fuel injected. Pressure measurement at this point requires the integration of an additional sensor that can detect dynamic pressure fluctuations with sufficient accuracy. Such a sensor is out of the question for reasons of cost. As such a sensor operates invasively, it also changes the hydraulic properties of the injection line.

Sensors based on the magneto-elastic effect are known. This means that a ferromagnetic material changes its magnetic properties when it is subject to a change in length. This means that the hysteresis curve that describes the non-linear relationship between the magnetic field H and the magnetic flux density B by means of the magnetic permeability $\mu_r$ is extended or compressed (see FIG. 3).

The pressurized fuel produces radial and axial compressive and tensile stresses in the injection line made of ferromagnetic material. A pressure change therefore results in a change in the mechanical stresses in the injection line material. The magneto-elastic effect causes the magnetic permeability of the material $\mu_r$ to change, resulting in a magnetic flux density B that changes approximately in proportion to the pressure fluctuation, when the magnetic field H is constant. A magnetic flux density B that changes over time produces an induced voltage $U_{ind}$ in a coil according to the law of induction. This voltage can be measured and used to reconstruct the pressure fluctuations in the injection line.

The publication DE 101 00 957 A1 discloses a sensor having three wire-wound coils, wound round an injection line. Direct current flows through the two outer coils, thereby producing a magnetic field H that is constant over time. The center coil is used to measure the induced voltage. This is amplified by a signal amplifier arranged in proximity to the sensor. To screen it from external magnetic fields that may have the effect of interfering with the induced voltage, the sensor may be enclosed by a screening housing made of magnetically soft material that is attached to the injection line.

The publication DE 197 57 293 A1 describes a device for determining the start of injection by means of a magneto-elastic sensor, which is used to determine the relative pressure for example.

It is a disadvantage of known sensors that they cannot determine the absolute pressure within an injection line.

SUMMARY

The object of the invention is therefore to propose a device and method that can determine the absolute pressure within a pipe through which there is a fluid flow.

The invention relates to a method for determining the absolute pressure in pipes through which there is a fluid flow, in particular injection lines in internal combustion engines. A first signal from a first pressure sensor is thereby detected. This first signal is integrated. The integrated signal is multiplied by a factor. This multiplied factor is then added to an operating pressure. This method according to the invention advantageously makes it possible to detect the absolute pressure within the injection line, connecting the rail of an internal combustion engine to the corresponding injector.

The step of integrating can only be carried out during a specified time period. The start of the time period may correspond essentially to the start of injection by an injector connected at the end of the pipe. The factor may change over time. In an internal combustion engine the factor that changes over time can be a function of the rail pressure, the injection pattern and/or the pipe material. The operating pressure can be detected with the aid of a second pressure sensor in an internal combustion engine in proximity to a high-pressure pump supplying the pipe with fluid or on a rail. The pipes can be injection lines in an internal combustion engines.

The object can also be achieved by a device for determining the absolute pressure in pipes, through which there is a fluid flow, the device comprising a first pressure sensor, an integration unit coupled with the first pressure sensor; a multiplication unit coupled with the integration unit; and an addition unit coupled with the multiplication unit.

A low-pass filter and/or a high-pass filter can be connected between the first pressure sensor and the integration unit. An activation unit of the injector can be connected to the integration unit to initiate the start of integration. The device may have a second pressure sensor, which is arranged closer to a high-pressure pump supplying the pipe with fluid than the first pressure sensor. The first pressure sensor can be a magneto-elastic sensor arranged round the pipe. The first pressure sensor can be arranged in proximity to an injector. In an internal combustion engine with a rail and at least one injector the first pressure sensor can be arranged between the rail and the injector, such that the pressure in the injection line connecting the rail and the injector can be detected. The second pressure sensor can be arranged on the rail, such that the mean rail pressure can be detected. The pipes can be injection lines in a diesel-operated internal combustion engines.

To prevent the integrated value drifting, it is advantageous to carry out integration during a specified time period. The start of integration can thereby correspond to the start of injection in a corresponding injector. This can for example be achieved by detecting the edge of the control signal of the injector. In a further advantageous embodiment of the invention the factor changes over time. Said factor can thereby be a function of the rail pressure, the injection pattern and/or the pipe material. This dependency over time can for example be achieved by approximating to a third order polynomial.

The method and device according to the invention thereby allow the pressure in an injection line to be measured in a non-invasive manner, i.e. without changing the hydraulic properties of the injection line. The simple structure of the sensor means that it is significantly cheaper to produce than conventional pressure sensors. Information about the pressure fluctuations in the injection line in proximity to the injector, which was hitherto not available for a comparable outlay, can be used to correct the injection pattern. More precise volume dosage can thereby be achieved, as will be required for stricter emission legislation in the future. Also the frequency of the measured oscillations in known fluid properties of the fuel can be used to deduce the temperature of the fuel in proximity to the injector. During a cold start the frequency information can be used to deduce the nature of the fuel (summer or winter diesel) rather than the temperature (which is in fact known at this point). Furthermore diagnosis functions to monitor the injectors are possible.

BRIEF DESCRIPTION OF THE DRAWINGS

The invention is described below with reference to the schematic drawing by way of an example, in which.

DETAILED DESCRIPTION

Figure 1:
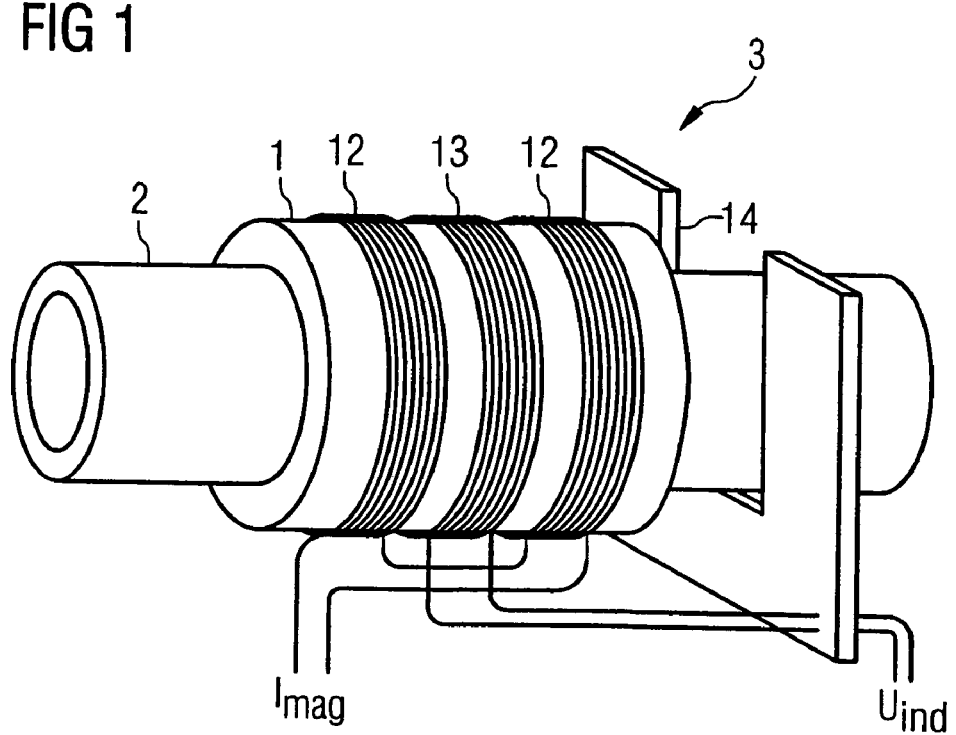
FIGS. 1, 2 show two embodiments of a magneto-elastic pressure sensor.

FIG. 1 shows a first pressure sensor 3 with an element 1, referred to as the core 1. The core 1 is connected non-positively to a ferromagnetic pipe 2 (injection line).

The first pressure sensor 3 can also have a magnetic bias coil 12, the windings of which are wound such that there is a space in roughly half the number of windings. The magnetic bias coil 12 encloses the core 1 and is connected non-positively to it.

A measuring coil 13 is arranged in this space in the magnetic bias coil 13, enclosing the core 1 in a non-positive manner. A measuring amplifier 14 can also be arranged, such that it is at the smallest possible distance from the measuring coil 13. The fact that there is the smallest possible distance between the measuring amplifier 14 and the measuring coil 13 allows interference to be reduced, thereby allowing a better signal to noise ratio to be achieved. A structure of this type with two windings, like a transformer, is very sensitive but not necessary. A single winding, like that of the measuring coil 13, is sufficient to be able to determine the pressure in the line. Use of just one coil (winding) allows a simple, robust structure.

The magnetization current $I_{mag}$ flowing through the magnetic bias coil 12 produces a magnetic field, which polarizes the core 1.

In this exemplary embodiment of the first pressure sensor, which is referred to as a cylinder sensor, the magnetic bias coil 12 and the measuring coil 13 are arranged coaxially in relation to the hollow cylinder shaped core 1 and the injection line 2.

An open magnetic circuit is present in a cylinder sensor of this type. A greater magnetic field strength H is therefore required to achieve a specific magnetic flux density B than with a closed magnetic circuit.

Figure 2:
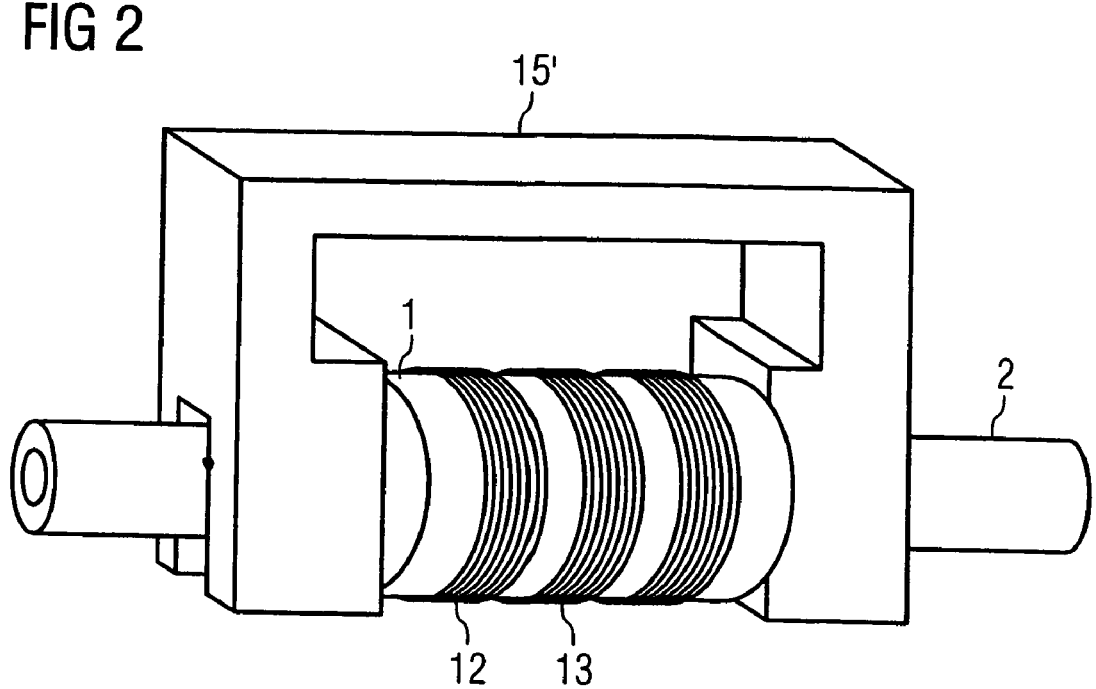

In another exemplary embodiment (FIG. 2) the cylinder sensor has a second element 15, referred to as the yoke 15'. This yoke 15' encloses the injection line 2 at least partially and is connected mechanically to the annular front faces of the cylindrical core 1.

The yoke 15' closes the magnetic field lines leaving the front faces of the core 1. The pressure sensor referred to as a yoke sensor therefore has a closed magnetic circuit.

It is advantageous to use soft iron or transformer lamination as the material for the yoke 15'.

Figure 3:
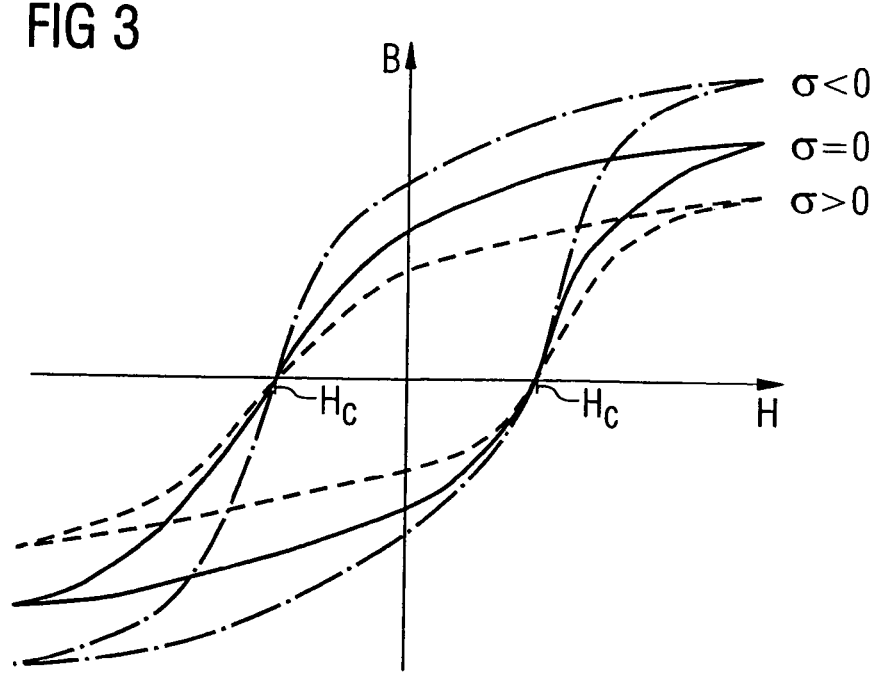
FIG. 3 shows the hysteresis curve for, a ferromagnetic material.

FIG. 3 shows the magnetic flux density B across the magnetic field H of a ferromagnetic material. The hysteresis curve shown in FIG. 3 changes as the load on the ferromagnetic material changes. If the material is subject to compressive stress ($\sigma<0$), the hysteresis curve is compressed by the magneto-elastic effect (shown with a dot-dash line). If the material is subject to a tensile stress ($\sigma>0$), the hysteresis curve is extended (shown with a broken line). The magnetic material with no mechanical load produces the hysteresis curve shown with a solid line ($\sigma=0$).

Figure 4:
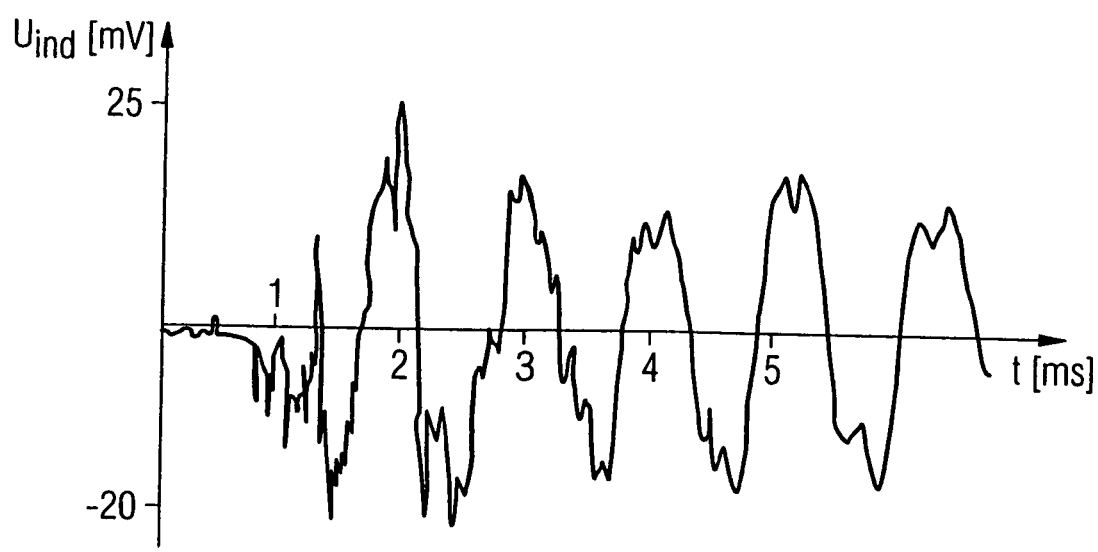
FIG. 4 shows the voltage induced in the pressure sensor during an injection operation.

A pressure change in a pipe 2 produces a mechanical strain on the walls of the pipe. The magneto-elastic effect produces a change in magnetic permeability $\mu_r$, which in turn causes a change in the magnetic flux density B. According to Faraday's law, voltage is induced in a coil arranged round the pipe and can be measured as a sensor signal. Such an induced voltage over time is shown in FIG. 4. The pressure sensor 3 shown in FIG. 1 is thereby arranged in proximity to an injector in an internal combustion engine. The curve shown in FIG. 4 shows the voltage induced in the measuring coil 12 during an injection operation.

Figure 7:
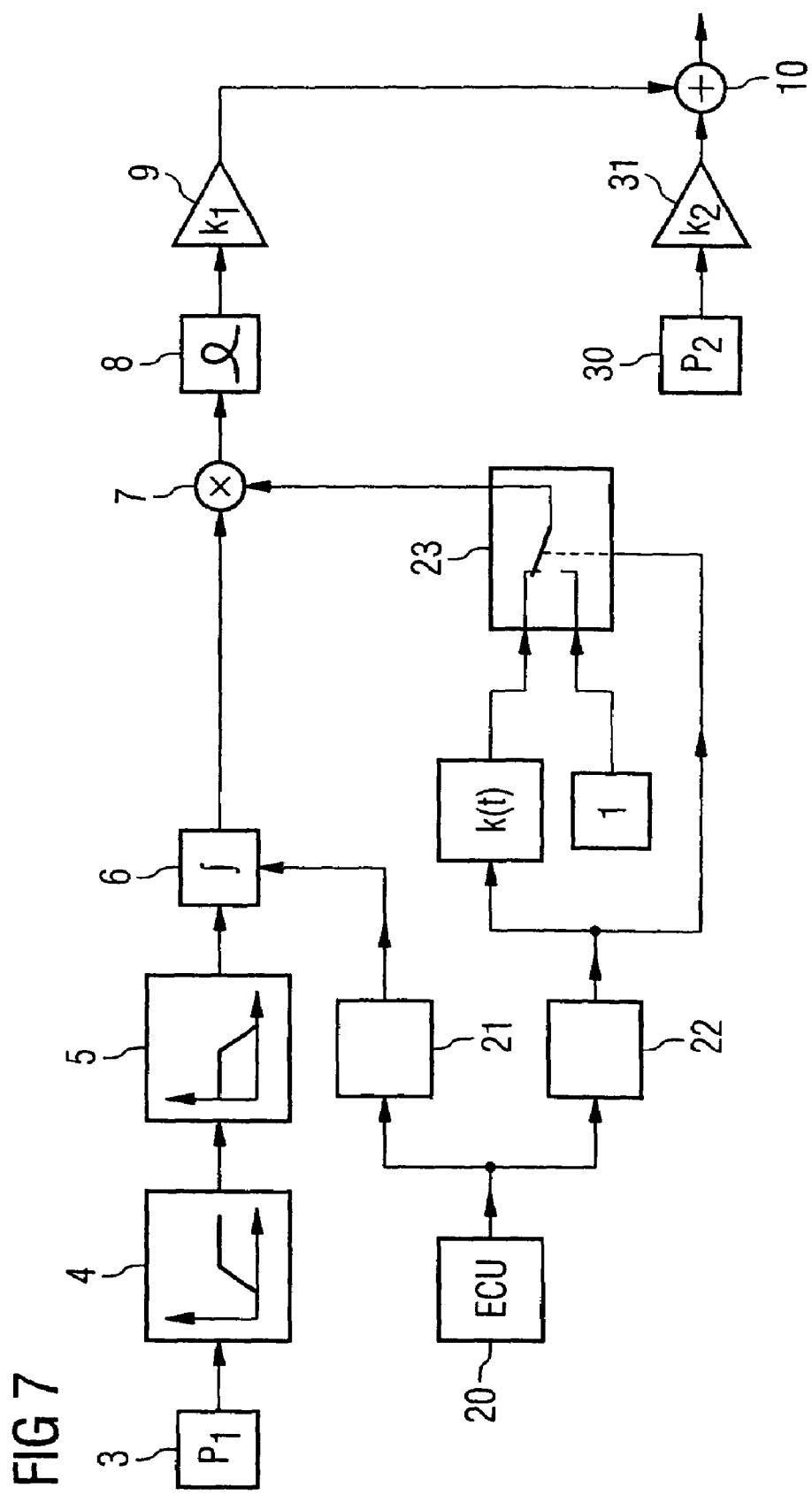
FIG. 7 shows a schematic diagram of the algorithm for pressure reconstruction.

A circuit structure according to the invention is shown in FIG. 7. The first pressure sensor 3 is connected to a high-pass filter 4, to suppress interference below a frequency of 500 Hz, in particular frequencies around 50 Hz and 150 Hz. The output of the high-pass filter 4 is connected to the input of a low-pass filter 5. This low-pass filter 5 suppresses interference with a frequency above 1600 Hz, in particular around at a frequency around 2700 Hz. The output of the low-pass filter 5 is connected to a first input of an integration unit 6. The output of the integration unit 6 is connected to a first input of a multiplication unit 7. This multiplication unit 7 is in turn connected to the input of a delay unit 8. This delay unit 8 is connected to a first scaling unit 9, which is connected to a first input of an addition unit 10. The output of the addition unit 10 shows the absolute pressure within the injection line 2.

At the start of injection an ECU 20 emits an activation signal for an injector. This activation signal is used in an edge detection unit 21 to determine the start of injection for the injector. The output of the edge detector 21 is connected to the second input of the integration unit 6, to prevent the integrated signal drifting. Integration is stopped after the pressure oscillation within the injection line decays.

A further edge detector 22 also uses the activation signal for an injector to change a factor k that changes over time. The output of the switching unit 23 is connected to the second input of the multiplication unit 7.

A second pressure sensor 30 is connected to a second scaling unit 31. The output of this scaling unit 31 is connected to the second terminal of the addition unit 10. This serves to record the operating pressure $p_0$ at the start of the integration operation. Such a second pressure sensor 30 can for example be connected in proximity to a high-pressure pump or be directly in the rail. Attenuation of the oscillations within the rail and the inertia of the sensor mean that said sensor cannot detect high frequencies, so the second pressure sensor 30 measures a mean pressure within the rail.

Figure 5:
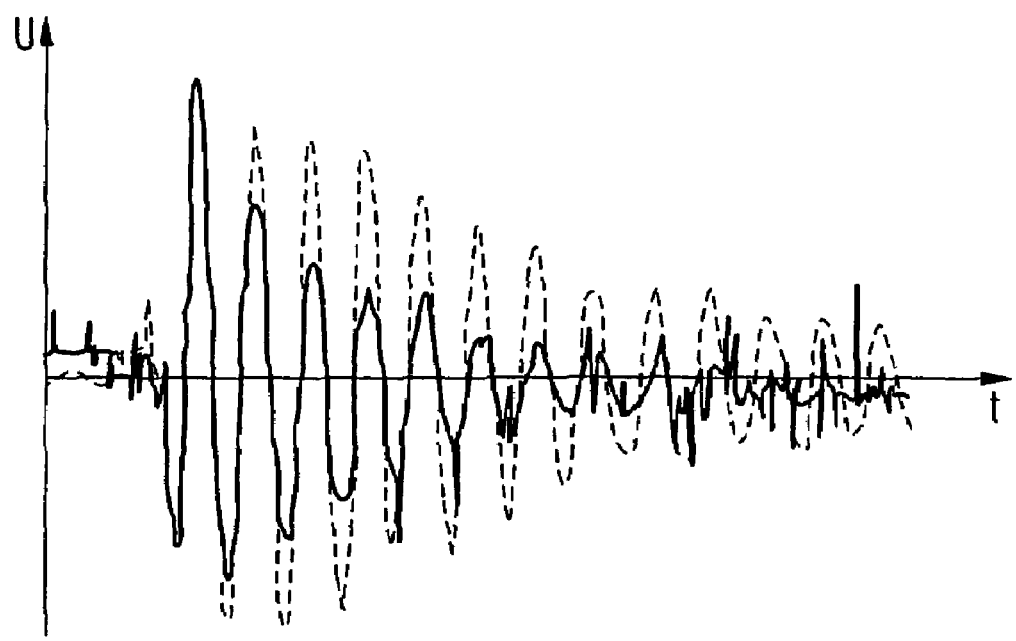
FIG. 5 shows filtered and integrated induced voltage compared with the signal from a reference sensor.

The curve shown in FIG. 4 is taken through the two filters 4 and 5 and then integrated in the integration unit 6. The filtered and integrated induction signal is shown as a broken curve in FIG. 5. The solid curve in FIG. 5 shows a reference signal. It can be seen from this that the filtered and integrated signal has the same oscillation period as the reference signal but amplitudes that are too high.

Figure 6:
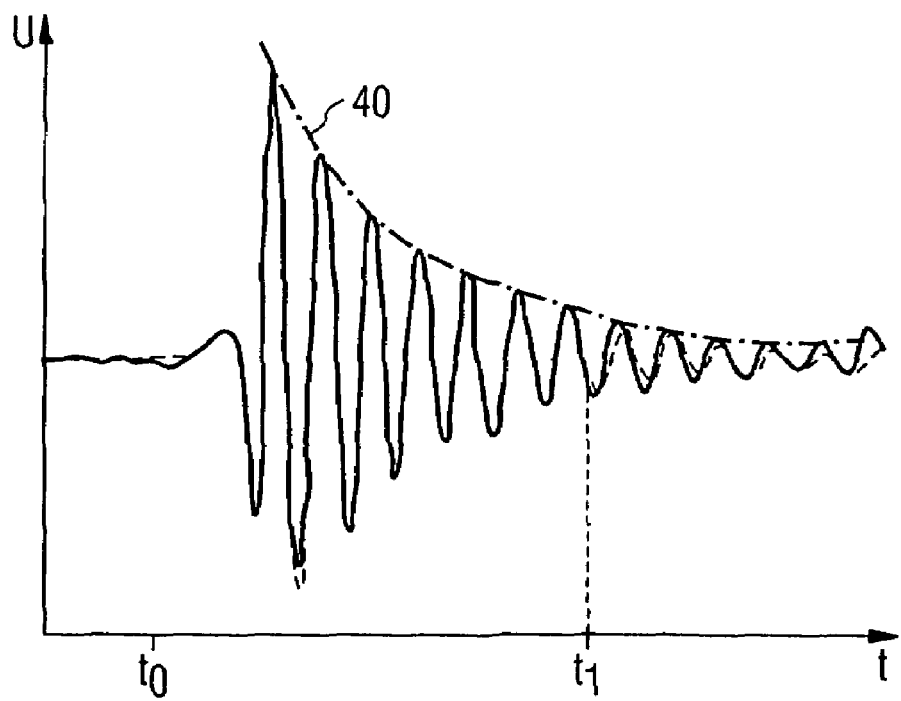
FIG. 6 shows a scaled signal compared with the reference signal.

FIG. 6 shows the scaled measuring signal (broken line) compared with the reference signal (solid line). This scaled signal is output at the output of the addition unit 10. Fuel injection starts at time $t_0$. The injector activation signal is identified by the side detection unit 21 and instructs the integration unit 6 to start integration. Hardly any deviations can be identified between the reference signal (solid line) and the scaled signal (broken line) until time $t_1$. The envelope curve 40 marked with a dot-dash line represents the factor k that changes over time.

The envelope curve 40 can be determined for every first pressure sensor with the aid of the reference signal (solid line). The individual envelope curve can be stored in a storage unit (not shown).

A cheaper alternative is for example only to measure every $30^{th}$ pressure sensor and determine its envelope curve. This envelope curve is used for the next 29 pressure sensors produced.

It may be the case that the non-individualized envelope curve is not appropriate for a pressure sensor.

In such a case the switching unit 23 is provided to disable the k factor. A constant factor (=1) is supplied to the multiplication unit 7 instead.

It is therefore possible to measure the absolute pressure within an injection line 2 using this method and device according to the invention.

What is claimed is:

1. A method for determining the absolute pressure in pipes, through which there is a fluid flow, comprising the following steps:
    a) generating a first signal by a sensor comprising a core arranged around a pipe and a measuring coil arranged around said core;
    b) detecting the first signal;
    c) integrating the first signal;
    d) multiplying the integrated value by a factor; and
    e) adding an operating pressure to the multiplied value.

2. A method according to claim 1, wherein the step of integrating is only carried out during a specified time period.

3. A method according to claim 2, wherein the start of the time period corresponds essentially to the start of injection by an injector connected at the end of the pipe.

4. A method according to claim 1, wherein the factor changes over time.

5. A method according to claim 4, wherein in an internal combustion engine the factor that changes over time is a function of a rail pressure, an injection pattern and/or a pipe material.

6. A method according to claim 1, wherein an operating pressure is detected with the aid of a second pressure sensor in an internal combustion engine in proximity to a high-pressure pump supplying the pipe with fluid or on a rail.

7. A method according to claim 1, wherein the pipes are injection lines in an internal combustion engines.

8. A device for determining the absolute pressure in pipes, through which there is a fluid flow, the device comprising:
    a first pressure sensor comprising a core arranged around a pipe and a measuring coil arranged around said core,
    an integration unit coupled with the first pressure sensor;
    a multiplication unit coupled with the integration unit; and
    an addition unit coupled with the multiplication unit.

9. A device according to claim 8, wherein a low-pass filter and a high-pass filter are connected between the first pressure sensor and the integration unit.

10. A device according to claim 8, wherein a low-pass filter or a high-pass filter is connected between the first pressure sensor and the integration unit.

11. A device according to claim 8, wherein an activation unit of an injector is connected to the integration unit to initiate the start of integration.

12. A device according to claim 8, wherein the device has a second pressure sensor, which is arranged closer to a high-pressure pump supplying the pipe with fluid than the first pressure sensor.

13. A device according to claim 8, wherein the first pressure sensor is a magneto-elastic sensor arranged round the pipe.

14. A device according to claim 8, wherein the first pressure sensor is arranged in proximity to an injector.

15. A device according to claim 14, wherein in an internal combustion engine with a rail and at least one injector the first pressure sensor is arranged between the rail and the injector, such that the pressure in the injection line connecting a rail and the injector can be detected.

16. A device according to claim 15, wherein the second pressure sensor is arranged on the rail, such that the mean rail pressure can be detected.

17. A device according to claim 8, wherein the pipes are injection lines in a diesel-operated internal combustion engines.

18. A device for determining the absolute pressure in pipes, through which there is a fluid flow, the device comprising:
    a first pressure sensor,
    an integration unit coupled with the first pressure sensor;
    a low-pass filter and/or a high-pass filter are connected between the first pressure sensor and the integration unit;
    a multiplication unit coupled with the integration unit; and
    an addition unit coupled with the multiplication unit.

19. A device according to claim 18, wherein an activation unit of an injector is connected to the integration unit to initiate the start of integration.

20. A device according to claim 18, wherein the device has a second pressure sensor, which is arranged closer to a high-pressure pump supplying the pipe with fluid than the first pressure sensor.

21. A device according to claim 18, wherein the first pressure sensor is a magneto-elastic sensor arranged round the pipe.

22. A device according to claim 18, wherein the first pressure sensor is arranged in proximity to an injector.

23. A device according to claim 22, wherein in an internal combustion engine with a rail and at least one injector the first pressure sensor is arranged between the rail and the injector, such that the pressure in the injection line connecting a rail and the injector can be detected.

24. A device according to claim 23, wherein the second pressure sensor is arranged on the rail, such that the mean rail pressure can be detected.

25. A device according to claim 18, wherein the pipes are injection lines in a diesel-operated internal combustion engines.

* * * * *